Patented May 13, 1924.

1,493,930

UNITED STATES PATENT OFFICE.

HENRY A. GARDNER, OF WASHINGTON, DISTRICT OF COLUMBIA.

PAINT.

No Drawing.        Application filed January 10, 1923.   Serial No. 611,689.

*To all whom it may concern:*

Be it known that I, HENRY A. GARDNER, a citizen of the United States, residing at Washington, District of Columbia, have invented new and useful Improvements in Paints, of which the following is a specification.

This invention relates to paints and more particularly to paints adapted to be applied to the under-water parts of ships, piles, board wharving and the like to prevent the accumulation of marine growth such as barnacles, hydroids, bryozoa, worm tubes, etc.

In order that a clearer perception of the present invention may be had it may be stated that it is well known that the liquid composition of the paints usually applied for the above named purpose must be of rapid drying nature in order that two coats may be applied in one day's time while a ship is in dock. A further consideration is the production of a more or less hard film. For this purpose, liquids composed of shellac or rosin dissolved in suitable volatile solvents have usually been applied. These resins, however, are either expensive, difficult to obtain, or of such high acidity (rosin has an acid value of 150) as to react very rapidly when applied with such basic pigments as zinc oxide.

I have discovered that ester gum, a product made by glycerin esterification of rosin or other acid resins and having an acid number usually not over 6 or 8, may be applied with zinc oxide and other basic pigments after it has been dissolved in a suitable volatile solvent. No hardening, thickening or other objectionable action occurs when such a product is used. I also find that the ester gum liquid prepared as suggested above dries with extreme rapidity to a very tough glossy surface that has some very peculiar reaction in repelling the marine growths referred to above. The results after exposure under salt water obtained with ester gum are entirely at variance with those obtained with similar paints made with straight rosin. The ester gum paint is much more resistant to the collection of marine growths.

I have further discovered that in order to add somewhat to the water resistance and other desirable properties of this compound, the introduction of a small amount of rubber in solution in benzol or other solvent is desirable and that the introduction of a small amount of pine oil produced from the distillation of pine gum is also desirable. I do not, however, claim exclusive use of pine oil or rubber in my paint, as these materials have heretofore been applied in paints of various kinds.

I have further discovered that paints of white or of a light tint are much more resistant to marine growths than dark colored paints such as have always been used heretofore. This may be due to the optical effects, the reflection or transmission of certain light rays, or to the individual preference of the organism for dark colors. At any rate, I prefer to use a paint having a high percentage of opaque white pigments and a relatively small amount of color pigments.

It may be briefly stated, therefore, that one of the primary objects of the present invention is to provide a paint particularly adapted for submarine use having the charactertistics of being quick drying, tough, semi-resilient, free from objectionable thickening while standing as well as repellant to marine growths by reason of its ingredients and color.

A further object is to provide a paint of the above character which is relatively inexpensive and easy to make and mix and having a base which can be made either anti-corrosive or anti-fouling.

As an example of my preferred method of making an anti-corrosive ester gum paint of the above character I suggest the use of 650 pounds of ester gum dissolved in 100 gallons of benzol. I then add 10 gallons of spar varnish and 10 gallons of pine oil. I then grind in 360 pounds of zinc dust and 960 pounds of zinc oxide. After grinding, I add to this batch 48 gallons of rubber solution containing 5% of rubber dissolved in 95% of benzol. This product is then ready to use and may be applied in the ordinary manner as the priming coat over steel or other surfaces.

The anti-fouling paint may be mixed of the following ingredients in substantially the proportions named. In 77 gallons of benzol I dissolve 650 pounds of ester gum. I then add 10 gallons of spar varnish and 10 gallons of pine oil. Then 1000 pounds of pigments, preferably opaque white pigments such as zinc oxide or titanox or lithopone are added. Toxics such as bichloride of mercury, mercuric oxide and copper oxide, mixed in any proportion desired, a total of 150 pounds, may then be added. Paris green may be used as the toxic, if a light green color is desired. After grinding, 48 gallons of benzol-rubber solution made as suggested above, are added. The material is then ready to use.

My procedure is first to apply one coat of anti-corrosive paint and then one or two coats of the anti-fouling paint; a very beautiful, lustrous, hard, tough, elastic surface resulting. These paints dry in about thirty minutes time, and when immersed in water have been found to be extremely waterproof and resistant to marine growths of all kinds.

It is, of course, to be understood that variations in the types of pigments used in this paint may be made without departing from the spirit of this invention. Likewise, different toxic ingredients may be employed, for instance, I may use organic toxics such as chlorinated coal tar derivatives which may sometimes contain arsenic and similar metallic poisons. I may also apply the juices or extracts from various plants, such as strychnine, etc. I may also apply various color pigments to give the desired color.

It will, therefore, be seen from the above that the present invention contemplates the manufacture of a hard, tough, elastic paint, particularly adapted for submarine use, which will dry in a relativeliy short period of time and will efficiently resist marine growths of all kinds.

What I claim is:—

1. A paint of the character described inlucding an ester gum in the liquid base and containing rubber in solution.

2. A paint of the character described including an ester gum in the liquid base and containing rubber in solution and a toxic ingredient.

3. A paint of the character described comprising an ester gum in the liquid base and containing an organic toxic.

4. A white or light tint of paint of the character described comprising ester gum as the liquid base and having rubber in solution, and a toxic.

Signed at Washington, District of Columbia, December, 1922.

HENRY A. GARDNER.